(12) United States Patent
Jakeš et al.

(10) Patent No.: US 6,909,075 B2
(45) Date of Patent: Jun. 21, 2005

(54) METHOD AND APPARATUS FOR HEAT TREATMENT OF RAW MATERIALS

(75) Inventors: Petr Jakeš, Prague (CZ); Michal Burda, Prague (CZ); Renata Johnová, Prague (CZ)

(73) Assignee: LeRoy Eclat AG, Olten (CH)

( * ) Notice: Subject to any disclaimer, the term of this patent is extended or adjusted under 35 U.S.C. 154(b) by 20 days.

(21) Appl. No.: 10/247,352

(22) Filed: Sep. 20, 2002

(65) Prior Publication Data

US 2004/0056026 A1 Mar. 25, 2004

(51) Int. Cl.$^7$ ................................................ H05B 6/78
(52) U.S. Cl. ........................................ 219/701; 373/31
(58) Field of Search ................................ 219/690, 693, 219/687–689, 701, 702, 703; 588/219–222, 247; 110/250, 255; 373/1, 27, 31

(56) References Cited

U.S. PATENT DOCUMENTS

| | | | |
|---|---|---|---|
| 3,611,582 A | * 10/1971 | Hamid et al. | 219/693 |
| 4,624,854 A | * 11/1986 | Naumann et al. | 219/701 |
| 4,880,578 A | 11/1989 | Holcombe et al. | |
| 4,940,865 A | 7/1990 | Johnson et al. | |
| 4,957,434 A | 9/1990 | Radomsky | |
| 5,240,656 A | * 8/1993 | Scheeres | 264/297.1 |
| 5,254,818 A | 10/1993 | Aubert | |
| 5,467,694 A | * 11/1995 | Mochizuki et al. | 219/701 |
| 5,597,504 A | 1/1997 | Berson et al. | |
| 5,822,879 A | 10/1998 | Vincent et al. | |
| 5,869,816 A | 2/1999 | Strack et al. | |
| 5,968,400 A | 10/1999 | Wicks et al. | |
| 6,262,405 B1 | 7/2001 | Wicks et al. | |
| 2002/0069678 A1 | 6/2002 | Aslanova | |

FOREIGN PATENT DOCUMENTS

| | | |
|---|---|---|
| CZ | 288 978 | 10/2001 |
| DE | 19541132 A1 | 4/1997 |
| EP | 0 957 068 A1 | 11/1999 |
| WO | 00/78684 A1 | 12/2000 |
| WO | 01/81258 A1 | 11/2001 |
| WO | 01/96250 A1 | 12/2001 |

* cited by examiner

Primary Examiner—Tu Hoang
(74) Attorney, Agent, or Firm—Burns, Doane, Swecker & Mathis, L.L.P.

(57) ABSTRACT

Apparatus for heat treatment of raw materials for production of a melt includes a first chamber having a first chamber crucible, a first chamber inlet for a raw material leading to the first chamber crucible, at least one first chamber microwave generator, and a first chamber outlet for a melt formed from the raw material, at least a second chamber having a second chamber crucible, a second chamber inlet for receiving the melt leading to the second chamber crucible, at least one second chamber microwave generator, and a second chamber outlet, and one or more baffles or cascades arranged within the apparatus so that the melt flows over, under, or through an opening in at least one of the baffles or cascades. A preheating chamber and/or a storage chamber can also be included. A method of producing a homogeneous melt from raw materials by volume microwave heating is also provided.

32 Claims, 4 Drawing Sheets

METHOD AND APPARATUS FOR HEAT TREATMENT OF RAW MATERIALS

BACKGROUND OF THE INVENTION

1. Field of the Invention

The present invention relates to the production of melts from raw materials including refractory materials and glass-based materials. In addition, the present invention relates to an apparatus for the heat treatment of raw materials for the production of a melt and methods of forming a melt that is chemically and physically homogeneous.

2. Discussion of Related Art

In the discussion of the related art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention, if appropriate.

Glassy fiber, which is currently produced from natural materials, such as basalt, can be made using a variety of methods. For example, continuous basalt fiber can be produced from melts formed in furnaces heated by gas burners or electrical heating elements. However, the heat distribution, changes in the composition of the melt (for example, by oxidation of divalent iron), imperfect homogenization of the melt, and the long period of time (approximately ten hours) the melt remains in the furnace, because, for example, the low thermal conductivity of silicate materials, can effect the melt. Such processes can result in a disproportionate consumption of energy, can use equipment incorporating precious metals, and can have limited equipment service life, thereby reducing the overall economic efficiency.

In another example, materials can be processed in a microwave furnace as disclosed in International Publication No. WO 00/78684 A1 published Dec. 28, 2000 and Czech patent application no. PV 2000-935 of 25 May 2000, the entire contents of both applications are herein incorporated by reference. The disclosed microwave process uses additives of a carbide, nitride, or boride group to activate the raw material for the absorption of microwave radiation. The disclosed microwave process is a single-stage process and is, thus, difficult to operate in a continuous fashion. Also, the single-stage furnace can impact the homogenization process and can reduce the quality of the formed melt, since the physical properties, such as viscosity, can be effected during charging of raw material into the melt. In addition, the single-stage method can complicate industrial application, since large-capacity production of melt is limited.

Additional examples of microwave furnaces and their applications are disclosed in WO 01/81258 A1, WO 01/96250 A1. U.S. Patent Application Publication No US 2002/0069678 A1, and U.S. Pat. No. 4,880,578 (Holcombe et al.), U.S. Pat. No. 4,940,865 (Johnson et al.), U.S. Pat. No. 4,957,434 (Radomsky), U.S. Pat. No. 5,254,818 (Aubert), U.S. Pat. No. 5,597,504 (Berson et al.) U.S. Pat. No. 5,822,879 (Vincent et al.), U.S. Pat. No. 5,869,816 (Strack et al.), U.S. Pat. No. 5,968,400 (Wicks et al.), and U.S. Pat. No. 6,262,405 B1 (Wicks et al.), the entire contents of each are herein incorporated by reference.

OBJECTS AND SUMMARY

Chemically and physically homogeneous melts, e.g., having homogeneous and/or isotropic mechanical, temperature and rheological properties, without the presence of foreign particles, e.g. unmelted material, and with heterogeneous transport properties are desirable. It is also desirable to have a method of production of a chemically homogeneous melt for the purpose of the production of continuous glassy fiber by, for example, drawing.

The present invention provides an apparatus for the heat treatment of raw materials for the production of a melt. An exemplary apparatus comprises a first chamber including a first chamber crucible, a first chamber inlet for a raw material leading to the first chamber crucible, at least one first chamber microwave generator, and a first chamber outlet for a melt formed from the raw material, at least a second chamber including a second chamber crucible, a second chamber inlet for receiving the melt leading to the second chamber crucible, at least one second chamber microwave generator, and a second chamber outlet, and one or more baffles or cascades arranged within the apparatus so that the melt flows over, under, or through an opening in at least one of the baffles or cascades.

Another exemplary embodiment of the apparatus for the heat treatment of raw materials for the production of a melt comprises a preheating chamber including a preheating chamber inner space and a preheating chamber heating element and a plurality of microwave sections, each microwave section having a first chamber including a first chamber crucible, a first chamber inlet for a raw material leading to the first chamber crucible, at least one first chamber microwave generator, and a first chamber outlet for a melt formed from the raw material, having at least a second chamber including a second chamber crucible, a second chamber inlet for receiving the melt leading to the second chamber crucible, at least one second chamber microwave generator, and a second chamber outlet, and having one or more baffles or cascades arranged within the apparatus so that the melt flows over, under, or through an opening in at least one of the baffles or cascades, wherein the first chamber inlet receives the raw material from the preheating chamber.

An exemplary method of producing a homogeneous melt of a raw material comprises melting a raw material by volume microwave heating in a first chamber to form a melt, the raw material including a silicate rock, a refractory material or a glass-based material, and homogenizing the melt in a second chamber, wherein homogenizing includes raising a temperature of the melt above a liquidus temperature.

Another exemplary method of producing a homogeneous melt of a raw material comprises inserting a raw material into a first chamber crucible of a first chamber, microwave volume heating the raw material to form a melt from the at least a portion of the raw material, transferring the melt to a second chamber crucible of a second chamber, and homogenizing the melt by microwave volume heating.

BRIEF DESCRIPTION OF THE DRAWING FIGURES

Aspects and advantages of the invention will become apparent from the following detailed description of preferred embodiments thereof in connection with the accompanying drawings in which like numerals designate like elements and in which.

DETAILED DESCRIPTION OF THE PREFERRED EMBODIMENTS

Figure 1:
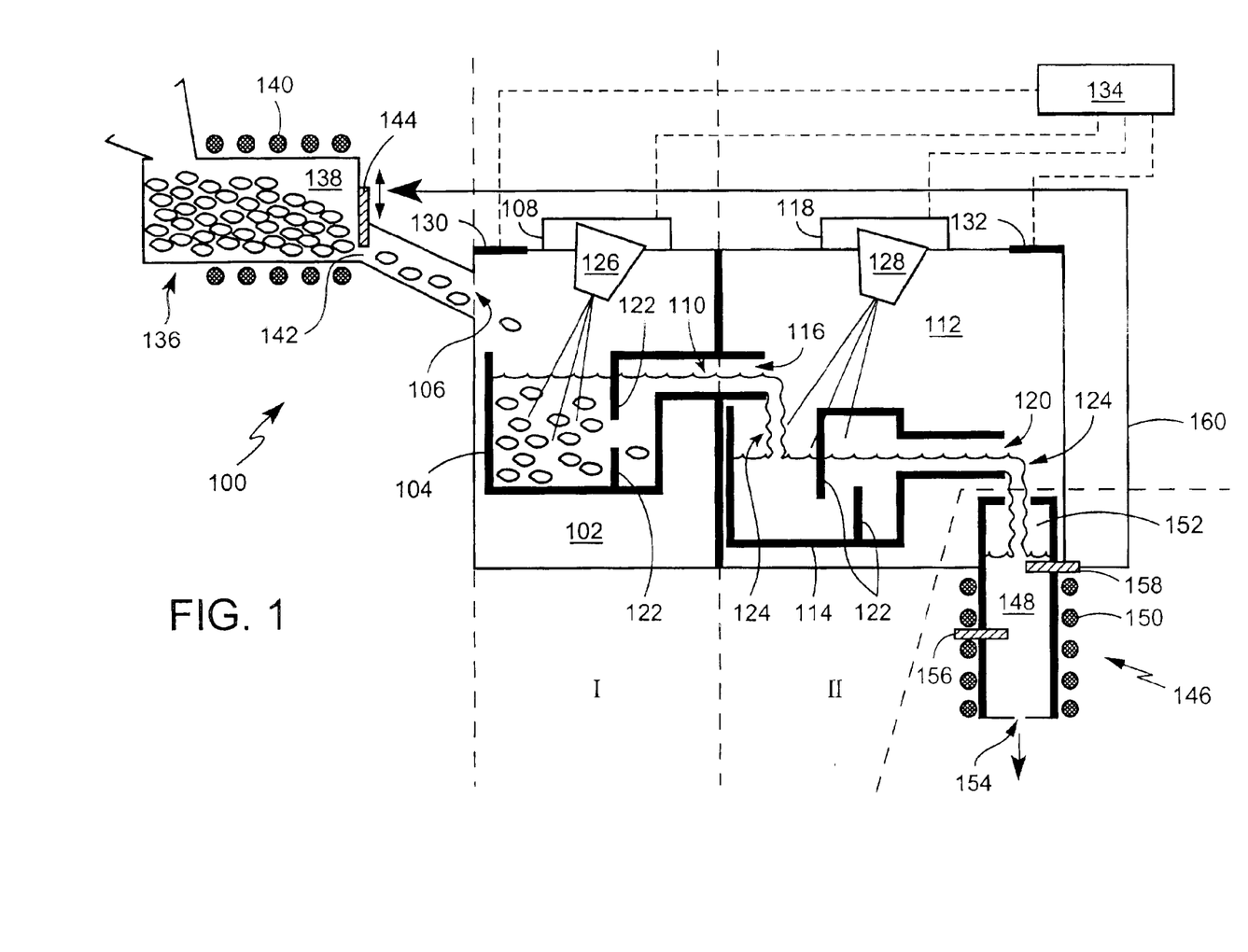
FIG. 1 shows an exemplary embodiment of an apparatus for heat treatment of raw materials for the production of a melt.

An exemplary embodiment of an apparatus 100 for the heat treatment of raw materials for the production of a melt is shown in FIG. 1. The apparatus 100 comprises a first chamber 102 including a first chamber crucible 104, a first chamber inlet 106 for raw material leading to the first chamber crucible 104, at least one first chamber microwave generator 108 and a first chamber outlet 110 for a melt formed from the raw material. The apparatus 100 has at least a second chamber 112 including a second chamber crucible 114, an inlet 116 for receiving the melt leading to the second chamber crucible 114, at least one second chamber microwave generator 118 and a second chamber outlet 120. The apparatus 100 also has one or more baffles 122 or cascades 124 arranged within the apparatus so that the melt flows over, under or through an opening in at least one of the baffles 122 or cascades 124.

As shown in FIG. 1, the apparatus has two heating zones, however, any number of heating zones can be used. For example, at least one chamber can correspond to heating zone I and two or more chambers can be in heating zone II. The thermally insulated bottom of these sections can be equipped with blocks of material with minimum absorption of microwaves, e.g., aluminum oxide mixed with zirconium oxides, or aluminum silicate ($Al_2SiO_5$) based materials.

Figure 2:
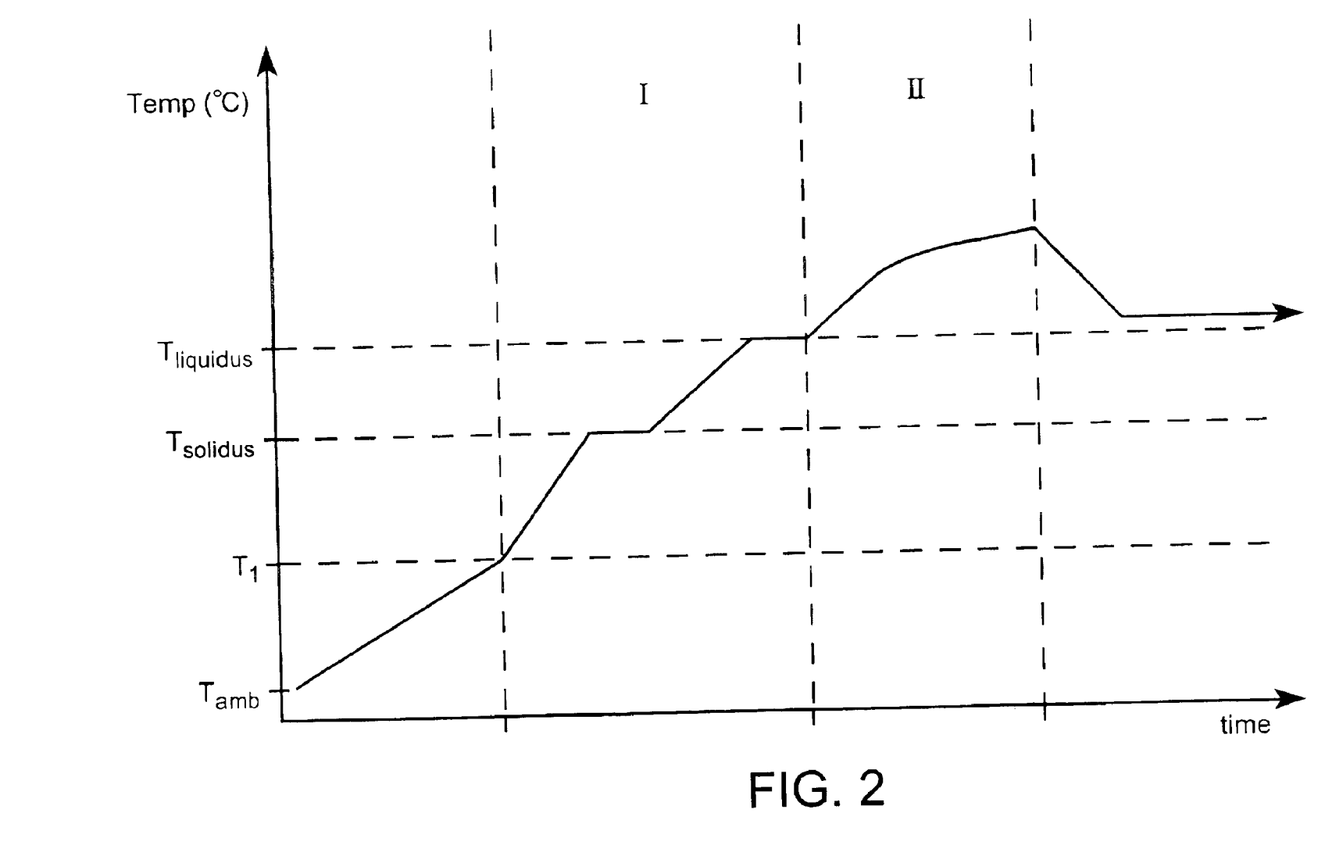
FIG. 2 shows a temperature versus time plot for the exemplary apparatus of FIG. 1 indicating the temperature profile of the raw material in heating zones I and II.

FIG. 2 shows an exemplary temperature versus time plot for a raw material moving through the apparatus indicating the temperature profile in heating zones I and II. In the exemplary embodiment of FIG. 1, heating zone I includes the first chamber 102 and heating zone II includes the second chamber 112.

Raw materials are introduced at an elevated temperature above the ambient temperature ($T_{amb}$), e.g., 400° C. or greater, preferably 500–800° C., and are microwave volume heated in heating zone I to at least the solidus temperature ($T_{solidus}$), e.g., approximately 900 to 1200° C. (±10%) for basalt or other silicate rocks, oxides, or carbonates. In heating zone I, the raw materials become molten forming a melt. In heating zone I, as the raw material becomes molten, the melt can also be a mixture of molten and nonmolten raw materials, depending on the composition of the raw materials and the melting temperatures of the composition. During melting, the temperature of the melt is approximately constant as the raw materials absorb the latent heat of melting, Further, the temperature in heating zone I can be limited and/or buffered by the addition of raw material into heating zone I, if a continuous process, or can be limited by any nonmolten materials that remain in heating zone I. For example, the temperature can be constant at approximately the solidus temperature, e.g., within 50° C. of the solidus temperature, due to the latent heat of melting and/or can be constant at approximately the liquidus temperature, e.g., within 50° C. of the liquidus temperature, as additional raw material are added to the melt. Microwave volume heating can include any microwave heating method in which the raw material absorbing microwaves is heated, while the material of the crucible or other vessel holding the raw material, being made from microwave transparent material, remains unaffected by the microwaves, other than being heated by conduction from the melt.

The melt from heating zone I, e.g., the molten material or a mixture of molten and nonmolten material, is subsequently introduced into heating zone II wherein it is microwave volume heated to above the liquidus temperature ($T_{liquidus}$) of the melt, e.g., superheated. For basalt or other silicate rocks, oxides, or carbonates, the liquidus temperature is approximately 1150–1350° C. (±10%). The melt can be heated to 200–600° C. above the liquidus temperature, e.g. approximately 1350 to 1950° C. for basalt or other oxides, silicates, or carbonates, and, preferably, to greater than 300° C. above the liquidus temperature. In heating zone II, the melt is homogenized, refined or combinations thereof.

Homogenizing can include raising the temperature of the melt above a liquidus temperature. Preferably, the temperature during homogenizing is maintained at a sufficient temperature, e.g., 200–600° C., preferably greater than 300° C., above a liquidus temperature of the melt, for a sufficient time, e.g., at least two hours, to melt all the raw material and/or to retard crystallization of the melt by, for example, preventing the formation of crystallization nuclei. Further, sufficient time can include time to allow diffusion under concentration gradients within the melt to homogenize the chemical composition of the melt. The diffusion can result in a uniform chemical composition of the melt. Homogenizing can also include turning over or otherwise mixing or agitating the melt to promote uniformity of composition.

Refining can include any process, including a mechanical process, in which a nonmolten particle with a specific weight higher than the melt settles to the bottom of the melt, e.g., settles to the bottom of the crucible holding the melt, and a nonmolten particle with a specific weight lower than the melt floats to the top of the melt. For example, a baffle or a cascade can be used in either heating zone I or heating zone II, e.g., within either the first chamber crucible, the second chamber crucible, or between the first chamber crucible and the second chamber crucible, such as associated with the connection between the crucibles. During transport of the melt, the melt can overflow the baffles removing impurities and nonmolten materials, which are trapped behind the baffle. Other examples include motive or nonmotive mechanical agitation, such as rocking or stirring including use of a motorized stirrer, and flowing through a tortuous path, such as a baffle and/or cascade, or other suitable process and/or structure placed in the flow path of the melt to separate the material that has settled to the bottom and/or floated to the top from the melt.

With reference to the exemplary embodiment shown in FIG. 1, the first chamber microwave generator 108 can be controlled to melt the raw material to form a melt and the second chamber microwave generator 118 can be controlled to heat the melt. For example, the first chamber microwave generator 108 can operate at a frequency range from 1 MHz to 10 GHz, preferably a frequency of 2 to 3 GHz, to raise the temperature of the raw material in the first chamber crucible 104 above a solidus temperature of the raw material to form a melt. The second chamber microwave generator 118 can operate at a frequency range from 1 MHz to 10 GHz, preferably 2 to 3 GHz, and can raise the temperature of the melt in the second chamber crucible 114 above the liquidus temperature. Other suitable frequencies include those allocated to RF and MW heating, such as 2 to 3 GHz, preferably 2.45 GHz, in the United States and 13.6 MHz, 27.2 MHz, 896 MHz, 915 MHz and 2.45 GHz in Europe. In addition, either monomodal or bimodal microwaves can be used.

A microwave energy waveguide can be included in either the first chamber or the second chamber or both chambers and can be associated with either or both of the microwave generators to direct the microwave energy of the respective microwave generator to at least a portion of the raw material or the melt. For example and as shown in the exemplary embodiment of FIG. 1, a first chamber microwave energy waveguide 126 associated with the first chamber microwave generator 108 can direct the microwave energy produced by the first chamber microwave generator 108 to at least a portion of the raw material or the melt located within the first chamber crucible 104. A second chamber microwave energy waveguide 128 associated with the second chamber microwave generator 118 can direct the microwave energy produced by the second chamber microwave generator 118 to at least a portion of the melt located within the second chamber crucible 114.

Control of the first chamber microwave generator and the second chamber microwave generator can include temperature sensors providing information on temperature in the respective chambers to a controller. Further, the first chamber microwave generator and the second chamber microwave generator can operate independently of each other or can be coordinated for the continuous melting and heating of the raw material in the respective first and second chambers. For example, in the exemplary embodiment of FIG. 1, a temperature sensor, e.g., an optical pyrometer, can be located within each of the first chamber 102 and the second chamber 112, e.g., first chamber temperature sensor 130 can be in the first chamber 102 and second chamber temperature sensor 132 can be in the second chamber 112. The respective temperature sensor can provide temperature information concerning the raw materials in the first chamber 102, the melt in the first chamber 102, and/or the melt in the second chamber 112. The first chamber and second chamber temperature sensors 130, 132 can further be interfaced to an electronic controller 134, e.g., a microprocessor or other suitable electronic controller, which is further used to control at least one of the first chamber and second chamber microwave generators 108,118 to control the output and energy supplied from the respective first chamber and second chamber microwave generator 108,118.

The first chamber crucible 104 and the second chamber crucible 114 can be any suitable form. For example, the first chamber and second chamber crucibles 104, 114 can be any container that can hold the raw material and the melt before, during, and after the melting and heating process. For example, the first chamber and second chamber crucibles 104, 114 can be a tank, a vessel, a box, a cylinder, a sphere, a trough, or any other suitable geometric form that will hold the solid raw material and the melt. Further, the first chamber crucible 104 and second chamber crucible 114 can be formed from any suitable material that can withstand the temperature excursions of the apparatus 100, e.g., heated from ambient conditions to above 1950° C. Suitable materials for the first chamber and second chamber crucible 104, 114 include ceramics such as $MoSi_2$, $ZrSiO_4$, sintered alumina, cubic zirconia, $Cr_2O_3$, or other suitable ceramic materials. Further, suitable materials for the first chamber and second chamber crucibles 104, 114 can be used individually as coatings or as layers or multi-layers.

Baffles and cascades can be included in the apparatus to provide a tortuous path for the melt and/or to facilitate the separation of nonmolten material from the melt. For example and as shown in the exemplary embodiment of FIG. 1, as preheated crushed raw material is being continuously feed into the first chamber 102, a baffle 122 in the first chamber 102 can prevent the raw material from being mixed with the melt exiting the first chamber 102 through first chamber outlet 110. In another example and as shown in the exemplary embodiment of FIG. 1, a cascade 124 or other suitable cascade overflow formed by, for example, a suitable multi-level arrangement of the first and second chambers 102, 112, can overturn, mix or otherwise homogenize the melt flowing through the cascade. In another example and as shown in the exemplary embodiment of FIG. 3, one or more baffles or cascades in a transfer chute, can homogenize and refine the melt.

The raw material can include silicate rocks, refractory materials and glass-based materials, e.g., silicate or carbonate compounds. Refractory materials can include any high temperature materials based on silicon, carbon, oxygen, boron, titanium, calcium, aluminum or nitrogen. For example, refractory materials can include one or more materials selected from the group of silicates and compounds of carbon, oxygen, boron, titanium, calcium, aluminum or nitrogen. Glass-based materials can include both naturally occurring glasses or glass-forming compounds such as oxides, silicates or carbonates and also can include post-consumer glass, e.g., recycled glass. Preferably, the raw materials contain refractory materials based on basalt and other natural materials. An exemplary raw material can include crushed basalt. The raw material can be used directly or can be crushed or mechanically mixed to form splinters, powders, granulars, and so forth. The size of the raw material can be any suitable size for the apparatus. An exemplary size includes granulars of approximately 60 mesh or granulars that have passed through a sieve having a nominal aperture size of approximately 0.346 millimeters (e.g., 0.346±10%).

The apparatus 100 can optionally include a preheating chamber 136. As shown in FIG. 1, an exemplary preheating chamber 136 can have a preheating chamber inner space 138 in which raw materials are stored, loaded, or otherwise maintained during a preheating operation prior to introduction to the apparatus 100. For example, the preheating chamber 136 can be a hopper or a storage bin. The preheating chamber inner space 138 can be heated by a preheating chamber heating element 140. The preheating chamber heating element 140 can be any appropriate heating element, such as a resistive heater, a radiative heater, and inductive heater, or a heater using electromagnetic radiation, such as radio frequencies (RF). For example, the preheating chamber heating element 140 can be a gas or electric furnace. The preheating chamber 136 can also be insulated, for example, by conventional insulating materials.

Further, the preheating chamber 136 has a preheating chamber outlet 142 connected to the first chamber inlet 106. The preheating chamber outlet 142 can be connected directly to the first chamber inlet 106 or there can be a chute, conveying apparatus, e.g., gravity or motorized conveyer, or other suitable connection by which raw materials from the preheating chamber 136 can be introduced to the first chamber 102 of the apparatus 100. Further, a batching device 144 can be positioned between the preheating chamber 136 and the first chamber 102. The batching device 144 can be used to control or otherwise meter the introduction of raw material from the preheating chamber 136. For example, the batching device 144 can be a sliding door, a gate valve, a swinging stop, or other suitable mechanical device, either manually or remotely controlled, to alternately (a) block the passage of raw material from the outlet 142 of the preheating chamber 136 and (b) allow the passage of raw material from the preheating chamber 136.

In an exemplary embodiment, the apparatus 100 can optionally have a storage chamber 146. An exemplary storage chamber 146 is presented in FIG. 1 and is represented as removed from the microwave heating zones, e.g., removed from heating zones I and II. The storage chamber 146 includes a storage chamber inner space 148, a storage chamber heating element 150, a storage chamber inlet 152 for receiving the melt, and a storage chamber opening 154 for discharging homogenized and stabilized melt. The storage chamber inner space 148 can contain melt from the apparatus 100, which is then maintained above the liquidus temperature by the storage chamber heating element 150. The storage chamber heating element 150 can be any suitable heating element. For example, the storage chamber heating element 150 can be a resistive heater, such as a super kanthal heater, a radiative heater, an inductive heater, or a heater using electromagnetic radiation, such as radio frequencies (RF).

The storage chamber 146 can also have a storage chamber temperature sensor 156 and/or a storage chamber level indicator 158. For example, the storage chamber 146 can have a storage chamber temperature sensor 156 to determine the temperature of the melt within the storage chamber inner space 148. An exemplary storage chamber temperature sensor 156 is a thermocouple, such as a platinum-rhodium thermocouple, or a resistance thermometer. The storage chamber 146 can also have a storage chamber level indicator 158 to determine the level of the melt within the storage chamber inner space 148. The storage chamber level indicator 158 can be any suitable level indicator, such as a float, a coupling-type level indicator, and so forth.

As shown in FIG. 1, the storage chamber inlet 152 can be in operative communication with the second chamber outlet 120 to receive melt. Alternatively, the storage chamber inlet 152 can be in operative communication with any suitable tapping point of the first chamber 102 or second chamber 112 to receive melt. For example, the storage chamber inlet 152 can be in operative communication with the first chamber 102 downstream of the baffles 122, or with the second chamber 112 at an intermediate point between the baffles 122 and/or cascade 124. In addition, in an apparatus comprising more than two chambers, e.g., comprising three or more chambers, the storage chamber inlet 152 can be in operative communication with an outlet of any one of the chambers, subsequent to and including the first chamber.

As shown in FIG. 1, an exemplary embodiment of an apparatus 100 has a storage chamber 146 and a batching device 144 across the first chamber inlet 106. The storage chamber level indicator 158 can be connected electronically to the batching device 144. This electronic connection 160 can coordinate the operation of the batching device 144 for the introduction of raw material to the first chamber 102 with the removal of melt from the storage chamber 146. Accordingly, a continuous feeding and removal of material can occur.

The first chamber and second chamber can be positioned abutting each other within a suitable peripheral container. As shown in the exemplary apparatus 100 of FIG. 1, the first chamber 102 and second chamber 112 are in direct communication between the first chamber outlet 110, from which melt can exit the first chamber 102, and the second chamber inlet 116 for receiving the melt.

Figure 3:
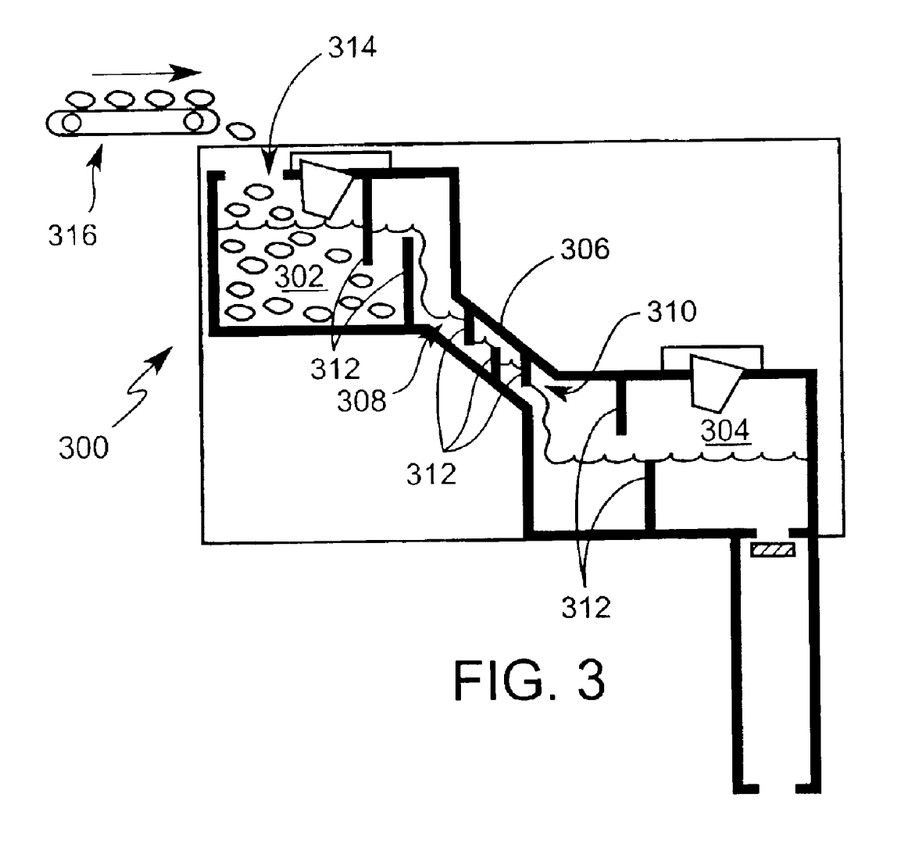
FIG. 3 shows a side elevation of an exemplary embodiment of an apparatus for heat treatment of raw materials for the production of a melt.

In an alternative embodiment based on the first chamber 102 and the second chamber 112 shown in FIG. 1, the first chamber and second chamber can be separated and melt can be transferred from the first chamber to the second chamber by a transferring device such as a transfer chute. FIG. 3 shows an exemplary apparatus 300 with a first chamber 302 separated from the second chamber 304 by a transfer chute 306. The first chamber 302 and second chamber 304 of the FIG. 3 apparatus are substantially similar to that shown and described for the FIG. 1 embodiment. The transfer chute 306 can connect the first chamber outlet 308 to the second chamber inlet 310. Further, the transfer chute 306 can include one or more baffles and/or cascades, such as a baffle 312, or any other suitable baffles and/or cascades, such as those shown in FIG. 1.

Exemplary embodiments of the apparatus for heat treatment of raw materials for the production of melt, can receive raw materials and insert the materials into the apparatus by any suitable means. For example, and as shown in FIG. 1, the raw materials can be inserted and/or stored in a preheating chamber 136. In the preheating chamber 136, the raw materials are heated to an elevated temperature to facilitate subsequent volume heating by the first and second chamber microwave generators 108, 118 within the apparatus 100. For example and as shown in FIG. 3, the raw materials can be inserted into the first chamber 302 through a first chamber inlet 314 from a conveying system 316, such as a conveyor belt, a gravity chute, or any other suitable conveying system.

Figure 4:
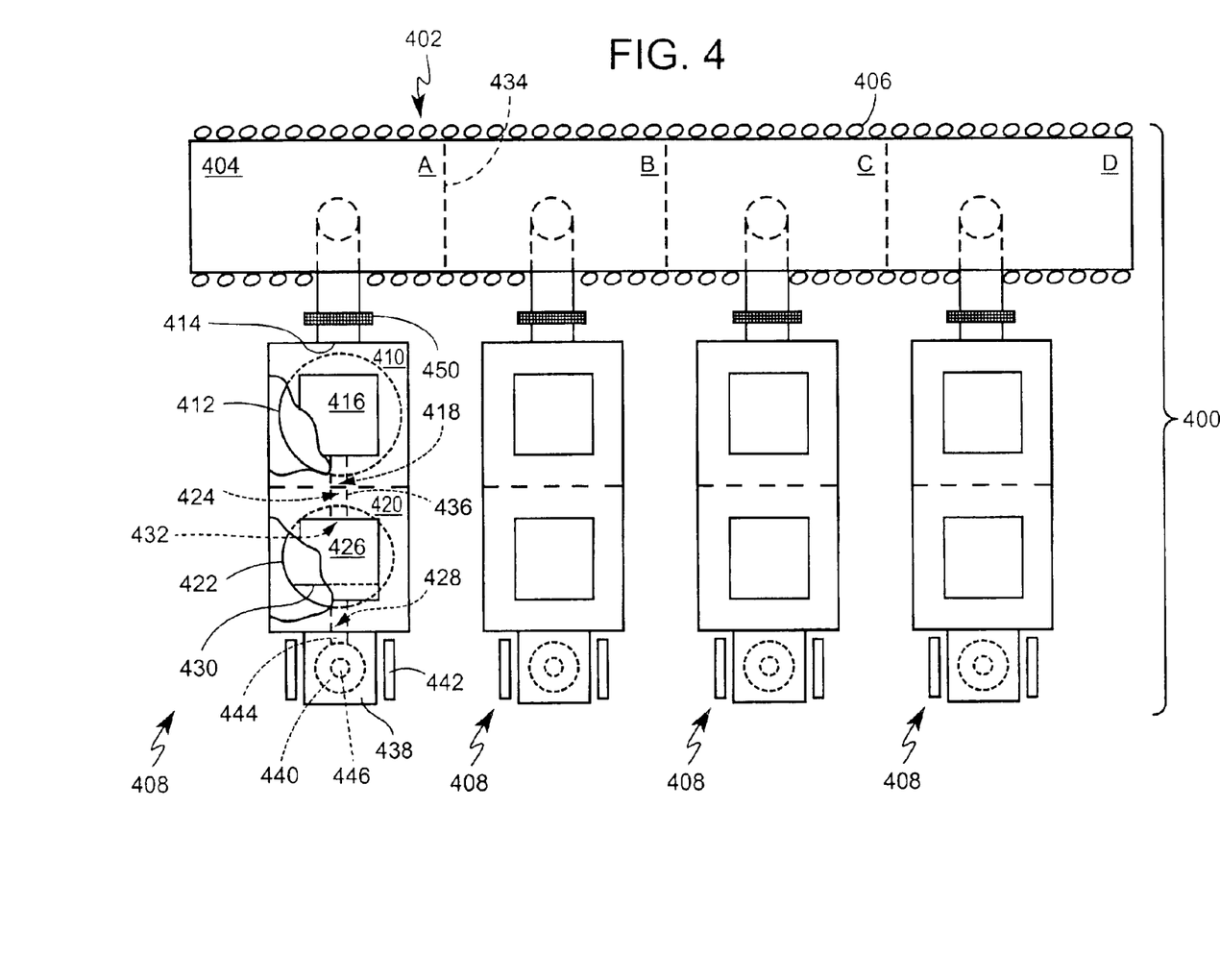
FIG. 4 shows an overhead elevation of an exemplary embodiment of an apparatus for heat treatment of raw materials for the production of a melt with a common preheating chamber feeding a plurality of microwave sections.

Another exemplary embodiment of an apparatus 400 for the heat treatment of raw materials for the production of a melt is shown in FIG. 4. In this embodiment, the apparatus 400 includes a preheating chamber 402, including a preheating chamber inner space 404 and a preheating chamber heating element 406, and a plurality of microwave sections 408. In the exemplary embodiment, the microwave section 408 includes a first chamber 410 and at least one second chamber 420. Each first chamber 410 has a first chamber crucible 412, a first chamber inlet 414 for raw material leading to the first chamber crucible 412, at least one first chamber microwave generator 416, and a first chamber outlet 418 for a melt formed from the raw material. Each second chamber 420 has a second chamber crucible 422, a second chamber inlet 424 for receiving the melt leading to the crucible 422, at least one second chamber microwave generator 426 and a second chamber outlet 428. One or more baffles 430 or cascades 432 are within at least one of the first chamber 410 and the second chamber 420. The first chamber inlet 414 receives raw material from the preheating chamber 402. In the exemplary embodiment, the first chamber 410 and the second chamber 420 can be any suitable form, such as substantially similar to the first chamber 102 and the second chamber 112 shown in FIG. 1 or FIG. 3.

The preheating chamber 402 can be any suitable size, orientation, or arrangement. For example, and as shown in FIG. 4, the preheating chamber 402 has a preheating chamber inner space 404 and is surrounded on at least two sides by a preheating chamber heating element 406. The preheating chamber heating element 406 can be any suitable heating element. For example, the preheating chamber heating element 406 can be a resistive heater, a radiative heater, an inductive heater, or a heater using electromagnetic radiation, such as radio frequencies (RF).

The preheating chamber inner space 404 can be continuous or can be divided by partitions 434, as shown in the exemplary embodiment of FIG. 4. Thus, for example, the preheating chamber 402 can have multiple or divided inner space regions, designated A, B, C, D in FIG. 4. These inner space regions can be independent from each other or be a division of a larger preheating volume within the preheating chamber inner space 404 that is divided only at a section of the preheating chamber inner space 404, e.g., divided where the raw material is being fed into the microwave section 408. Further, different raw material can be inserted into each of the inner space regions A, B, C, D for subsequent insertion into a different one of the plurality of microwave sections 408, e.g., a silicon-based material in a first inner space region, a boron-based material in a second inner space region, an oxygen-based material in a third inner space region, and so forth. Thus, for example, the partitions 434 allow segregation of input raw material to a specified microwave section and ultimately the production of a melt corresponding to the segregated raw material.

In the exemplary embodiment, the first chamber 410 and second chamber 420 are in operative communication to transfer the melt from the first chamber 410 to the second chamber 420. This transfer can be done by any suitable means or arrangement of the first chamber 410 and second chamber 420. For example, the first chamber 410 can directly empty into the second chamber 420, or a transfer chute 436 can connect the outlet 418 of the first chamber 410 to the inlet 424 of the second chamber 420. The transfer chute 436 can be a gravity chute, or other conveying apparatus, and can include one or more baffles or cascades, or other arrangements to provide a tortuous path, as presented and described in connection with the exemplary embodiment of FIG. 3.

The apparatus 400 optionally has at least one storage chamber 438. The storage chamber 438 can be any suitable storage chamber, such as those shown in FIGS. 1 and 3, or other storage chamber. Further, the storage chamber 438 can include a storage chamber inner space 440, a storage chamber heating element 442, a storage chamber inlet 444 for receiving the melt, and a storage chamber opening 446 for discharging homogenized and stabilized melt. The storage chamber inlet 444 of one of the storage chambers 438 is in operative communication with the second chamber outlet 428 of one of the microwave sections 408. Further, the storage chamber 438 can have a storage chamber temperature sensor and/or a storage chamber level indicator.

The exemplary embodiment of the apparatus 400 has a batching device 450 between the preheating chamber 402 and the microwave section 408. The batching device 450 can be any suitable metering or control device that operates to allow passage of raw material from the preheating chamber 402 to the microwave section 408 in a first position, e.g., an open position, and operates to prevent transfer of raw material from the preheating chamber 402 to the microwave section 408 in a second position, e.g., a closed position. In an embodiment in which the apparatus 400 has both a batching device 450 across the inlet to the microwave section 408, e.g., across the first chamber inlet 414, and a storage chamber level indicator at the storage chamber 438, the storage chamber level indicator can be connected electronically to the batching device 450.

As depicted in the exemplary embodiment of FIG. 4, each of the plurality of microwave sections 408 can be the same. However, it should be understood by one of ordinary skill in the art that the microwave section 408 can vary amongst the plurality of microwave sections. In addition, the microwave section 408 can vary according to the raw material to be heat treated for the production of a melt or according to the raw material placed in the associated region of the preheating chamber 402, where partitions are used. Further, the first chamber 410 and the second chamber 420 of the microwave section 408 can be substantially similar to that depicted and described with respect to the exemplary embodiments of FIG. 1 and FIG. 3.

Raw materials can be melted and refined and homogenized in a suitable apparatus. For example, the exemplary apparatuses shown and described in connection with FIGS. 1, 3, and 4 can be used to form a homogeneous melt.

An exemplary method of production of homogeneous melts of raw materials comprises melting a raw material by volume microwave heating in a first chamber to form a melt and homogenizing the melt in a second chamber. The melt can also be refined in the second chamber.

Melting the raw material includes raising the temperature of the raw material above a solidus temperature. For example, melting can be by volume microwave heating, which can cause oscillations of dipoles within the material. These oscillations volume heat the material. At the solidus temperature, the material begins to melt while absorbing heat associated with the transformation, e.g., the latent heat of melting.

Raising the temperature of the melt above the liquidus temperature can include heating by any suitable means, such as with a resistive heater, a radiative heater, such as a gas burner, an inductive heater, or a heater using electromagnetic radiation, such as RF energy. In an exemplary method, raising the temperature of the melt above the liquidus temperature is by microwave volume heating the melt in the second chamber.

The raw material can be optionally preheated in a preheating chamber. The preheated raw material is inserted into the first chamber which is separate from the preheating chamber. During the preheating, the raw material, such as raw material with a low microwave absorbance, is heated to a temperature of at least 400° C. By raising the temperature prior to microwave volume heating, the raw material is activated for the microwave volume heating process. Preheating in the preheating chamber can include heating with a resistive heater, a radiative heater, such as a gas burner, an inductive heater, or a heater using electromagnetic radiation, such as RF energy. In an exemplary method, preheating occurs without the addition of additives to the raw materials that enhance microwave absorption or otherwise increase the susceptibility of the raw material to microwave volume heating.

The temperature for preheating of the raw material can depend on the ability of such raw material to absorb microwave radiation. A lower temperature can be used in microwave melting raw materials with a higher content of metals than for raw materials containing $SiO_2$ or $Al_2O_3$, which are generally transparent to microwaves at lower temperatures. The preheated material, e.g., basalt, in an amount of 1–2 kg is supplied, e.g., conveyed, to the first chamber of the apparatus, where the raw material is subjected to microwave radiation and melts. The amount of raw material introduced into the first chamber is such that the melt can overflow into the second chamber, either directly, through a chute, through a baffle and/or cascade, or a combination thereof. In the second chamber, the temperature of the melt can be continuously increased by operation of the second microwave generator. In the second chamber, solids that have a higher specific weight than the melt (in the case of basalt it is, for example, olivine) settle, and at the same time a baffle and/or a cascade, for example, a baffle in an upper section of the tank, can prevent solids of a low specific weight, which float on the surface of the melt, e.g. dehydrated clays such as compounds of $Al_2O_3$ or $SiO_2$), from advancing to the outlet of the second chamber and any subsequent second chamber or storage chamber.

The homogenized and refined melt can be used directly or, optionally, is transferred to a storage chamber. The storage chamber can be maintained at a temperature above the liquidus temperature, by, for example, heating with a resistive heater, a radiative heater, an inductive heater, or a heater using electro magnetic radiation, such as RF energy. The melt in the storage chamber maintains a homogeneous and refined character by maintaining the temperature above the liquidus temperature.

Either a batch method, or preferably, a continuous method can be performed. For example, melt can be removed from the storage tank in coordination with insertion of raw material into the first chamber, resulting in a continuous process. The insertion of raw material into the first chamber can be controlled by, for example, a batching device, e.g., a metering device or other suitable device to control the insertion of raw material into the apparatus. The batching device could be at the entrance to the first chamber or at another suitable location. An output signal from a level detector at the storage chamber can control the batching device. For example, the batching device can be controlled to open to insert raw material into the first chamber when the level detector in the storage chamber is below a first level. Further, the batching device can be controlled to close when the level detector in the storage chamber is above a second level. In the described example, the first level is below the second level.

An exemplary method of production of a homogeneous melt of raw materials includes forming a fiber from the melt. Fiber can be formed from the melt by any suitable means, such as, by drawing the melt from the storage chamber, by drawing the melt from the second chamber, or by drawing the melt from any suitable location of the apparatus. Drawing the melt can include passing the melt through a nozzle to form filaments of the fiber.

In an exemplary embodiment, the apparatus and the method can provide for, and can achieve, physical and chemical homogeneity in the melt. For example, in applications requiring chemical and thermal stability, such as continuous basalt fiber drawing, the two zone heating apparatus and method produces a melt that is both physically and chemically homogeneous, e.g., has a uniform melting temperature, physical properties, such as viscosity and density, and softening temperature, and from which a product, such as a fiber, can be produced having isotropic mechanical properties, such as tensile strength, Young's modulus and/or softening temperatures.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. An apparatus for the heat treatment of raw materials for the production of a melt, the apparatus comprising:
   a first chamber including a first chamber crucible, a first chamber inlet for a raw material leading to the first chamber crucible, at least one first chamber microwave generator, and a first chamber outlet for a melt formed from the raw material;
   at least a second chamber including a second chamber crucible, a second chamber inlet for receiving the melt leading to the second chamber crucible, at least one second chamber microwave generator, and a second chamber outlet; and
   one or more baffles or cascades arranged within the apparatus so that the melt flows over, under, or through an opening in at least one of the baffles or cascades.

2. The apparatus of claim 1, comprising a preheating chamber including a preheating chamber inner space, a preheating chamber heating element, and a preheating chamber outlet connected to the first chamber.

3. The apparatus of claim 2, wherein the preheating chamber heating element is a resistive heater, a radiative heater, an inductive heater, or a heater using electromagnetic radiation.

4. The apparatus of claim 2, comprising a batching device between the preheating chamber and the first chamber.

5. The apparatus of claim 1, comprising a storage chamber including a storage chamber inner space, a storage chamber heating element, a storage chamber inlet for receiving the melt, and a storage chamber opening for discharging homogenized and stabilized melt.

6. The apparatus of claim 5, wherein the storage chamber inlet is in operative communication with the second chamber outlet.

7. The apparatus of claim 5, wherein the storage chamber heating element is a resistive heater, a radiative heater, an inductive heater, or a heater using electromagnetic radiation.

8. The apparatus according to claim 5, wherein the storage chamber has one or more selected from the group of a storage chamber temperature sensor and a storage chamber level indicator.

9. The apparatus according to claim 8, wherein the storage chamber temperature sensor is a thermocouple or a resistance thermometer.

10. The apparatus of claim 5, comprising a batching device across the first chamber inlet and a storage chamber level indicator at the storage chamber, wherein the storage chamber level indicator is connected electronically to the batching device.

11. The apparatus of claim 1, wherein the first chamber microwave generator is controlled to melt the raw material and the second chamber microwave generator is controlled to heat the melt.

12. The apparatus of claim 11, wherein the first chamber microwave generator is controlled independently from the second chamber microwave generator.

13. The apparatus according to claim 1, wherein each of the first chamber microwave generator and the second chamber microwave generator operates at a frequency range from 1 MHZ to 10 GHz.

14. The apparatus according to claim 13, wherein the frequency is 2 to 3 GHz.

15. The apparatus of the claim 1, comprising a first chamber microwave energy waveguide for directing the microwave energy produced by the first chamber microwave generator to at least a portion of the raw material or the melt.

16. The apparatus of the claim 1, comprising a second chamber microwave energy waveguide for directing the microwave energy produced by the second chamber microwave generator to at least a portion of the melt.

17. The apparatus of the claim 1, comprising a first chamber temperature sensor located within the first chamber and a second chamber temperature sensor located within the second chamber.

18. The apparatus according to claim 17, comprising an electronic controller connected to at least one of the first chamber temperature sensor and the second chamber temperature sensor and controlling output and energy supplied from the associated first chamber microwave generator or second chamber microwave generator.

19. The apparatus according to claim 1, wherein the baffles or cascades are within at least one of the first chamber and the second chamber.

20. The apparatus of claim 1, comprising a transfer chute connecting the outlet of the first chamber to the inlet of the second chamber, the transfer chute including one or more baffles or cascades.

21. An apparatus for the heat treatment of raw materials for the production of a melt, the apparatus comprising:
   a preheating chamber including a preheating chamber inner space and a preheating chamber heating element; and
   a plurality of microwave sections, each microwave section having a first chamber including a first chamber crucible, a first chamber inlet for a raw material leading to the first chamber crucible, at least one first chamber microwave generator, and a first chamber outlet for a melt formed from the raw material, having at least a second chamber including a second chamber crucible, a second chamber inlet for receiving the melt leading to the second chamber crucible, at least one second chamber microwave generator, and a second chamber outlet, and having one or more baffles or cascades arranged within the apparatus so that the melt flows over, under, or through an opening in at least one of the baffles or cascades,
   wherein the first chamber inlet receives the raw material from the preheating chamber.

22. The apparatus of claim 21, comprising a transfer chute connecting the first chamber outlet to the second chamber inlet, the transfer chute including one or more baffles or cascades.

23. The apparatus of claim 21, comprising at least one storage chamber, the storage chamber including a storage chamber inner space, a storage chamber heating element, a storage chamber inlet for receiving the melt, and a storage chamber opening for discharging homogenized and stabilized melt.

24. The apparatus of claim 23, wherein the storage chamber inlet of one of the storage chambers is in operative communication with the second chamber outlet of one of the microwave sections.

25. The apparatus of claim 21, comprising a batching device between the preheating chamber and at least one of the microwave sections.

26. The apparatus of claim 23, comprising a batching device across the first chamber inlet and a storage chamber level indicator at the storage chamber, wherein the storage chamber level indicator Is connected electronically to the batching device.

27. The apparatus of claim 21, wherein the first chamber microwave generator is controlled to melt the raw material and the second chamber microwave generator is controlled to heat the melt.

28. The apparatus of claim 27, wherein the first chamber microwave generator is controlled independently from the second chamber microwave generator.

29. The apparatus according to claim 21, wherein the first chamber microwave generator and the second chamber microwave generator operate at a frequency range from 1 MHZ to 10 GHz.

30. The apparatus according to claim 29, wherein the frequency is 2 to 3 GHz.

31. The apparatus of the claim 21, comprising a first chamber microwave energy waveguide for directing the microwave energy produced by the first chamber microwave generator to at least a portion of the raw material or the melt.

32. The apparatus of the claim 21, comprising a second chamber microwave energy waveguide for directing the microwave energy produced by the second chamber microwave generator to at least a portion of the melt.

* * * * *